3,004,867
ADHESIVE TAPE CONTAINING A POLYAMINE HOLD IMPROVING COMPOUND

Winifred Christina Collins, East Brunswick Township, Middlesex County, N.J., and John F. McElroy, Worcester, Mass., assignors, by mesne assignments, to Johnson & Johnson, New Brunswick, N.J., a corporation of New Jersey
No Drawing. Filed May 13, 1953, Ser. No. 354,882
5 Claims. (Cl. 117—122)

This invention relates to normally tacky and pressure-sensitive adhesives and has as its objective the provision of adhesives presenting particularly firm adhesive bonds by addition of minor proportions of adhesion-promoting agents to the adhesive composition.

Adhesion of a pressure-sensitive tape may be defined as its ability to resist removal when subject to a static shearing load after suitable application to a surface. Removal times are then the indices of the relative adhesion of the pressure-sensitive tapes in question.

A prior method of attaining desirable adhesion as defined above involved partial cure of the elastomer base of the pressure-sensitive adhesive with either an oil-soluble phenolic resin or conventional sulfur-bearing rubber vulcanizing agents. Both of these methods require expensive additional processing of the rubbery elastomer, and are somewhat hard to control so that the proper state of cure is reached providing increased adhesion without insolubility in ordinary rubber solvents and without loss of the valuable characteristics of normally tacky and pressure-sensitive adhesives.

Moreover, sulfur-bearing accelerators and vulcanizing agents are objectionable because they cause frequent stains when adhesive compositions of which they are part are applied to light colored surfaces. Such light colored surfaces are frequently encountered in the normal uses of adhesive tape: for instance, in connection with the taping of household appliances and of light colored automobiles.

In accordance with this invention, minor proportions of certain di or polyamines are added to conventional normally tacky and pressure-sensitive adhesive compositions to increase the relative adhesion as defined herein by as much as ten times. Such amines may be added at any stage of the pressure-sensitive adhesives, provided proper precautions are taken to insure a uniform dispersion. The amines may be added, for example, in an internal mixer of the Banbury type or with solvent in a Baker-Perkins mixer, or to the dissolved adhesive by means of a simple paddle stirrer.

The types of amines found to be of particular aid in promoting firmer adhesion may be best illustrated by the formula $H_2NR$, wherein R may be $NH_2$, $R_1NH_2$, $(CH_2)_2R_2$ or $(CH_2)_3R_2$; wherein $R_1$ may be at least one alkyl, alkanol, aralkyl or primary amine group having from two to six carbon atoms, but not an aryl group; and wherein $R_2$ is at least one primary or primary-secondary amine group, for instance of the alpha omega type, having from two to eighteen carbon atoms. Salts of these amines are included.

In other words hydrazine, ethylene diamine, tetraethylene pentamine and more complex compounds of this nature are included, but not such products as p-phenylene diamine or diphenyl p-phenylene diamine, nor such compounds as cystine and lysine. More than one of the compounds within the above group may be present in one and the same adhesive composition.

Di-hydrazine oxalate $NH_2$—$NH_3$—OOC,
$COO$—$NH_3$—$NH_2$,
1,3-diamino-2-propanol, $(NH_2CH_2)_2$ CHOH, 3,3'-imino bispropylamine, $NH(CH_2CH_2CH_2NH_2)_2$, and propylene diamine, $CH_3CH(NH_2)CH_2NH_2$ all have excellent adhesion-promoting properties.

Very small amounts of these chemical adhesion-promoting agents suffice to produce large effects. For example, with tetraethylene pentamine in adhesives formulated as follows:

Example A

The following compound was prepared in an internal mixer.

| | Parts by weight |
|---|---|
| Butadiene-styrene copolymer (about 24% styrene and 76% butadiene, Mooney viscosity 80) | 100 |
| Phenol modified polyterpene resin | 40 |

Example B

| | |
|---|---|
| Butadiene-styrene elastomer as above | 14 |
| Light tube natural rubber reclaim (60% rubber hydrocarbon) | 20 |
| Pará rubber | 8 |
| Zinc oxide | 20 |
| Petroleum oil | 5 |
| Polyterpene resin (melting point 70 degrees centigrade) | 25 |

Tetraethylene pentamine was added to the foregoing sample compounds in the following percentages by weight by stirring it into a toluene solution of each adhesive:

| Hold Improving Agent Percentage On a Dry Weight Basis | Relative Adhesion | |
|---|---|---|
| | Ex. A | Ex. B |
| .05 | 24+ | 9+ |
| .10 | 24+ | 9+ |
| .50 | 24+ | 9+ |
| 1.0 | 24+ | 9+ |
| 2.0 | 7 | 9+ |
| 3.0 | 15 | 9+ |
| 4.0 | 11 | 9+ |
| 5.0 | 1 | 1 |
| Control | 1.0 | 1.0 |
| 0.0 | 4 | 2 |

Using the adhesion-promoting agents of the invention is has been found that as little as one-hundredth of one percent of the hold-improving agent is often effective upon the adhesive compositions. In most cases a point is reached in the addition of the adhesive beyond which further increases of the hold-improving agent produce little additional benefit. In fact, addition of too much hold-improving agent may decrease adhesion, as shown in the preceding table. In general, best results are obtained by addition of not more than five percent hold-improving agent.

As further examples of representative formulations showing typical effects of chemical hold-improving agents, the following are given:

Example C

| | Parts by weight |
|---|---|
| Pale crepe rubber | 50 |
| Di-hydrazine oxalate | 0.5 |
| Di-tertiary butyl p-cresol | 1 |
| Polyterpene resin (melting point 115 degrees centigrade) | 40 |

In the above example the first two ingredients are milled together and the remaining parts are combined therewith in an internal mixer.

Example D

| | Parts by weight |
|---|---|
| Pale crepe rubber | 50 |
| Di-tert butyl p-cresol | 1 |
| Polyterpene resin (melting point 115 degrees centigrade) | 40 |

Example E

| | |
|---|---|
| Pale crepe rubber | 50 |
| Di-tert butyl p-cresol | 1 |
| Polyterpene resin (melting point 115 degrees centigrade) | 40 |
| Di-hydrazine oxalate | 0.5 |

In this example the last ingredient is stirred into the adhesive after its solution in toluene solvent.

Finished adhesive tapes prepared under identical conditions from the adhesive compositions of Examples C, D and E by dissolving them in toluene and spreading on the regenerated cellulose film had the following relative adhesions:

Example C: 4
Example D: 1
Example E: 2

In a similar manner two adhesive compositions were prepared using ethylene diamine as the hold-improving agent:

Example F

Parts by weight

| | |
|---|---|
| Milled pale crepe rubber | 50 |
| Polyterpene resin (melting point 70 degrees centigrade) | 19 |

Example G

| | |
|---|---|
| Milled pale crepe rubber | 50 |
| Polyterpene resin (melting point 70 degrees centigrade) | 19 |
| Ethylene diamine | 0.3 |

The relative adhesions were as follows:

Example F: 1
Example G: 2+

To illustrate the action of hold-improving agents having longer carbon chains, the following adhesive compositions were prepared:

Example H

Parts by weight

| | |
|---|---|
| Milled smoked sheet rubber | 100 |
| Phenol modified polyterpene resin (as in Ex. A) | 30 |

Example I

| | |
|---|---|
| Milled smoked sheet rubber | 100 |
| Phenol modified polyterpene resin (as in the preceding example) | 30 |
| Tetraethylene pentamine | 0.5 |

Relative adhesions were as follows:

Example H: 1
Example I: 3

To illustrate the use of hold-improving agents in adhesive compositions based on mixtures of butadiene rubbers, natural rubber and reclaimed rubber, the following examples are furnished:

Example J

Parts by weight

| | |
|---|---|
| A Banbury compound made of butadiene styrene rubber | 300 |
| Whole carcass reclaim | 300 |
| Smoked sheet rubber | 100 |
| Zinc oxide | 300 |
| Alkylated polyhydroxy phenol age resistor | 12 |
| Petroleum oil | 100 |
| Hydrocarbon polymer resin made from copolymerized conjugated dienes and active olefins (no saponification or acid number), melting point 207 degrees Fahrenheit to 217 degrees Fahrenheit | 100 |

To the above Banbury compound enough of the above resin was added to provide a total hydrocarbon resin content of eighty percent by weight of the rubber hydrocarbon content. An adhesive composition was prepared by solution in toluene.

Example K

To the Banbury compound of Example J there were added 3½ parts by weight of di-hydrazine oxalate which were thoroughly dispersed in the compound. The compound was then finished by addition of the same hydrocarbon resin in the same manner as Example J.

The relative adhesions of the above products were as follows:

Example J: 1
Example K: 7

A similar adhesive was prepared as follows:

Example L

Parts by weight

| | |
|---|---|
| Butadiene-styrene copolymer (as in Example A) | 14 |
| Light tube rubber reclaim (sixty percent rubber hydrocarbon) | 20 |
| Roll brown crepe rubber | 8 |
| Zinc oxide | 20 |
| Petroleum jelly | 4 |
| Resin glyceride | 30 |

Different hold-improving agents were added to this formula as shown in the following table:

| Agent | Percent Addition | Relative Adhesion |
|---|---|---|
| Ethylene diamine | 1.0 | 3.5. |
| Hydrazine hydrate | 1.0 | 4.2. |
| Hydrazine hydrate | 0.1 | 4.6. |
| Hexamethylene diamine | 0.5 | 11. |
| Tetraethylene pentamine | 0.5 | 11. |
| O-phenylene diamine | 0.5 | Adverse Effect. |
| Diphenyl p-phenylene diamine | 0.5 | Do. |
| N-butyl amine | 0.5 | Do. |
| Diethylene triamine | 0.5 | 8+. |
| Triethylene tetramine | 0.5 | 4+. |
| Propylene diamine | 0.5 | 5.3. |
| 1,3 diamino-2-propanol | 0.5 | 7.1. |
| 3-isopropyl amino propylamine | 0.5 | 3.1. |
| 3,3′ imino bis propylamine | 0.5 | 9.2. |
| 1,4 butane diamine dihydrochloride | 0.5 | 4.5. |
| No addition (control) | | 2.3. |
| R—NH—CH$_2$—CH$_2$—CH$_2$—NH$_2$ | 0.5 | 9.0. |
| R—NH—CH$_2$—CH$_2$—CH$_2$—NH$_2$ | 3.0 | 2.5. | wherein R is an eighteen carbon straight chain tallow.

Within the above mentioned concepts the invention is broad and includes the use of all compounds belonging to the group, preferably in amounts of from about one-hundredth of one percent to about five percent, based on the weight of the total composition and depending upon the desired adhesion. For very satisfactory adhesion, from about one-hundredth of one percent to about two percent adhesion is used normally. Smaller amounts cause some definite improvement but have been considered insufficient for some purposes. Amounts larger than two percent are desirable in some cases, but an excess over five percent does not improve the adhesion in most cases. Substantial improvements were obtained in the adhesion in most of the examples listed herein by way of explanation, but not as a limitation upon the scope of the invention. Exceptions are the two phenylene diamine and butyl amine examples listed in the last table, which are shown for comparison and to illustrate types of amines that are not useful for purposes of this invention.

The adhesives of the invention can be applied to any backing, preferably from solvent solution or dispersion, using aliphatic or aromatic solvents combined with or without heat spreading. The coaters used may be hot melt spreader, calender, reverse roll coater, knife or kiss coater.

Among the rubbery materials, natural rubber and copolymers of butadiene and styrene, particularly those comprising at least five percent of each of these two copolymers, are of particular utility in this invention.

Many other variations of the above described invention will be apparent to those skilled in the art and are included in the inventive concept.

We claim:
1. An adhesive tape comprising a flexible backing, and a coating on at least one surface of said backing of an adhesive composition comprising a rubber selected from the group consisting of natural rubber and the copolymers of butadiene and styrene and from about 0.01 to about five percent by weight of the composition of a hold-improving compound selected from the group consisting of ethylene diamine, tetraethylene pentamine, 1,3-diamino-2-propanol, 3,3-imino-bis propylamine, propylene diamine, hexamethylene diamine, diethylene triamine, triethylene tetraamine, 3-isopropyl-amino-propylamine, 1,4-butane diamine dihydrochloride, and R—NH—CH$_2$—CH$_2$—CH$_2$—NH$_2$ wherein R is an eighteen carbon straight chain tallow.

2. An adhesive tape as defined in claim 1 wherein said rubber comprises natural rubber.

3. An adhesive tape comprising a flexible backing, and a coating on at lease one surface of said backing of an adhesive composition comprising a rubber selected from the group consisting of natural rubber and the copolymers of butadiene and styrene and from about 0.01 to about five percent by weight of the composition of tetraethylene pentamine as a hold-improving compound.

4. An adhesive tape comprising a flexible backing, and a coating on at least one surface of said backing of an adhesive composition comprising a rubber selected from the group consisting of natural rubber and the copolymers of butadiene and styrene and from about 0.01 to about five percent by weight of the composition of hexamethylene diamine as a hold-improving compound.

5. An adhesive tape comprising a flexible backing, and a coating on at least one surface of said backing of an adhesive composition comprising a rubber selected from the group consisting of natural rubber and the copolymers of butadiene and styrene and from about 0.01 to about five percent by weight of the composition of triethylene tetraamine as a hold-improving compound.

References Cited in the file of this patent

UNITED STATES PATENTS

| | | |
|---|---|---|
| 1,933,026 | Osmum | Oct. 31, 1933 |
| 2,206,448 | Busse et al. | July 2, 1940 |
| 2,331,894 | Drew | Oct. 19, 1943 |
| 2,416,926 | Kemp | Mar. 4, 1947 |
| 2,457,335 | Williams et al. | Dec. 28, 1948 |
| 2,548,433 | Klein | Apr. 10, 1951 |
| 2,567,988 | Bethe | Sept. 18, 1951 |
| 2,576,968 | Pike et al. | Dec. 4, 1951 |
| 2,671,042 | Stokes | Mar. 2, 1954 |
| 2,692,871 | Pechukas | Oct. 26, 1954 |

FOREIGN PATENTS

| | | |
|---|---|---|
| 517,816 | Great Britain | Aug. 3, 1938 |